US012633456B2

(12) United States Patent
Wakamatsu

(10) Patent No.: US 12,633,456 B2
(45) Date of Patent: May 19, 2026

(54) MULTILAYER CERAMIC CAPACITOR

(71) Applicant: Murata Manufacturing Co., Ltd.,
Nagaokakyo (JP)

(72) Inventor: Toru Wakamatsu, Nagaokakyo (JP)

(73) Assignee: **MURATA MANUFACTURING CO.,
LTD.**, Kyoto (JP)

( * ) Notice: Subject to any disclaimer, the term of this
patent is extended or adjusted under 35
U.S.C. 154(b) by 107 days.

(21) Appl. No.: 18/661,768

(22) Filed: May 13, 2024

(65) Prior Publication Data

US 2024/0296995 A1     Sep. 5, 2024

Related U.S. Application Data

(63) Continuation of application No. PCT/JP2022/047111,
filed on Dec. 21, 2022.

(30) Foreign Application Priority Data

Dec. 27, 2021    (JP) ................................. 2021-212031

(51) Int. Cl.
H01G 4/012        (2006.01)
H01G 4/008        (2006.01)
H01G 4/30         (2006.01)
(52) U.S. Cl.
CPC ........... H01G 4/0085 (2013.01); H01G 4/012
(2013.01); H01G 4/30 (2013.01)
(58) Field of Classification Search
CPC ........ H01G 4/0085; H01G 4/012; H01G 4/30;
H01G 4/12; H01G 4/1209; H01G 4/1227;
(Continued)

(56) References Cited

U.S. PATENT DOCUMENTS

| 7,158,364 B2 * | 1/2007 | Miyauchi | ............... H01G 4/008 |
| | | | 361/311 |
| 9,281,121 B2 * | 3/2016 | Yoon | ........................ H01G 4/30 |

(Continued)

FOREIGN PATENT DOCUMENTS

| CN | 116741539 A | * | 9/2023 | ............... H01G 4/30 |
| JP | 2009032837 A | * | 2/2009 | ............... H01G 4/12 |

(Continued)

OTHER PUBLICATIONS

Translation of WO '920 (Year: 2021).*

(Continued)

*Primary Examiner* — Dion R. Ferguson
(74) *Attorney, Agent, or Firm* — Keating & Bennett, LLP

(57) ABSTRACT

A multilayer ceramic capacitor includes dielectric layers made of a ceramic material and inner electrode layers that are laminated. Each of the inner electrode layers includes a first metal as a main component, and dielectric coupling portions penetrating through in a lamination direction, filled with a portion of adjacent dielectric layers, and coupling the adjacent dielectric layers to each other. A solid-dissolved layer, in which a second metal different from the first metal is solid-dissolved, is provided at an interface between the dielectric coupling portions and the inner electrode layers. A content of the second metal in the solid-dissolved layer is about 0.1 mol % or more and about 10 mol % or less in 100 mol of the first metal.

20 Claims, 5 Drawing Sheets

(58) Field of Classification Search
CPC ...... H01G 4/232; H01G 4/2325; H01G 4/008;
Y02E 60/13
See application file for complete search history.

(56) References Cited

U.S. PATENT DOCUMENTS

| 10,714,262 | B2* | 7/2020 | Kim | H01G 4/1227 |
|---|---|---|---|---|
| 10,892,093 | B2* | 1/2021 | Kim | H01G 4/30 |
| 11,984,265 | B2* | 5/2024 | Endou | H01G 4/008 |
| 12,198,857 | B2* | 1/2025 | Doi | H01G 4/012 |
| 2008/0026136 | A1* | 1/2008 | Skamser | H01G 4/0085 |
| | | | | 156/89.12 |
| 2013/0038982 | A1 | 2/2013 | Lee et al. | |
| 2014/0285946 | A1* | 9/2014 | Yoon | H01G 4/0085 |
| | | | | 29/25.03 |
| 2015/0116898 | A1* | 4/2015 | Takashima | H01G 4/012 |
| | | | | 361/301.4 |
| 2018/0374643 | A1* | 12/2018 | Inomata | H01G 4/2325 |
| 2019/0304695 | A1* | 10/2019 | Kim | H01G 4/30 |
| 2019/0304696 | A1* | 10/2019 | Kim | H01G 4/12 |
| 2020/0066454 | A1* | 2/2020 | Cha | H01G 4/0085 |
| 2020/0273623 | A1* | 8/2020 | Sasabayashi | H01G 4/012 |
| 2021/0020363 | A1* | 1/2021 | Song | H01G 4/012 |
| 2021/0098191 | A1 | 4/2021 | Saito et al. | |
| 2021/0202177 | A1* | 7/2021 | Kurosu | H01G 4/008 |
| 2021/0202181 | A1* | 7/2021 | Wakashima | H01G 4/30 |
| 2023/0099467 | A1* | 3/2023 | Endou | H01G 4/012 |
| | | | | 361/311 |
| 2023/0207196 | A1* | 6/2023 | Doi | H01G 4/30 |
| | | | | 174/260 |
| 2024/0296995 | A1* | 9/2024 | Wakamatsu | H01G 4/12 |

FOREIGN PATENT DOCUMENTS

| JP | 2013042110 A | 2/2013 | |
|---|---|---|---|
| JP | 2018152547 A | 9/2018 | |
| JP | 2020031202 A | 2/2020 | |
| JP | 2021015965 A | 2/2021 | |
| JP | 2021034648 A | 3/2021 | |
| JP | 2021108360 A | 7/2021 | |
| KR | 101070151 B1 * | 10/2011 | .............. H01G 4/12 |
| WO | WO-2021171920 A1 * | 9/2021 | .......... H01G 4/1209 |

OTHER PUBLICATIONS

International Search Report in PCT/JP2022/047111, mailed Mar. 14, 2023, 3 pages.
Written Opinion in PCT/JP2022/047111, mailed Mar. 14, 2023, 4 pages.

* cited by examiner

MULTILAYER CERAMIC CAPACITOR

CROSS REFERENCE TO RELATED APPLICATIONS

This application claims the benefit of priority to Japanese Patent Application No. 2021-212031 filed on Dec. 27, 2021 and is a Continuation Application of PCT Application No. PCT/JP2022/047111 filed on Dec. 21, 2022. The entire contents of each application are hereby incorporated herein by reference.

BACKGROUND OF THE INVENTION

1. Field of the Invention

The present invention relates to multilayer ceramic capacitors.

2. Description of the Related Art

There is known a multilayer ceramic capacitor in which a plurality of dielectric layers made of a ceramic material and a plurality of inner electrode layers are laminated. In the multilayer ceramic capacitor, further miniaturization, larger capacitance, and an increase in reliability are required. Attempts have been made to reduce a thickness of the dielectric layer, reduce a thickness of the inner electrode layer, and increase the number of lamination of these layers.

Japanese Unexamined Patent Application Publication No. 2013-42110 discloses a problem that a short-circuit failure between the inner electrode layers occurs when the thickness of the dielectric layer is reduced. Further, Japanese Unexamined Patent Application Publication No. 2013-42110 discloses an invention in which a conductive layer is introduced between the inner electrode layers to solve the issue above and suppress a decrease in reliability.

When the thickness of the inner electrode layer is reduced, a plurality of through holes (dielectric coupling portions) are formed in the inner electrode layer. Since each of the plurality of through holes is filled with a portion of the adjacent dielectric layers and the adjacent dielectric layers appear to be coupled, the through hole formed in the inner electrode layer is referred to as the dielectric coupling portion in the present application. When the dielectric coupling portion is formed in the inner electrode layer, life expectancy of a multilayer ceramic capacitor may decrease, that is, reliability of the multilayer ceramic capacitor may decrease.

SUMMARY OF THE INVENTION

Example embodiments of the present invention provide multilayer ceramic capacitors that each reduce or prevent a decrease in reliability.

The inventor of example embodiments of the present invention has achieved new discoveries that concentration of an electric field occurs in a dielectric coupling portion in an inner electrode layer, and as a result, life expectancy of a multilayer ceramic capacitor decreases, that is, reliability of the multilayer ceramic capacitor decreases. Further, as a result of intensive studies, the inventor of preferred embodiments of the present invention have achieved new discoveries that when a solid-dissolved layer is provided at an interface between the dielectric coupling portion and the inner electrode layer, the concentration of the electric field is reduced, and as a result, a decrease in life expectancy, that is, a decrease in reliability of a multilayer ceramic capacitor is reduced. In the solid-dissolved layer above, a metal such as Sn, for example, different from a main component metal of the inner electrode layer such as Ni, for example, is solid-dissolved.

A multilayer ceramic capacitor according to an example embodiment of the present invention includes dielectric layers made of a ceramic material and inner electrode layers that are laminated. Each of the inner electrode layers includes a first metal as a main component, and each of the inner electrode layers includes dielectric coupling portions penetrating through in a lamination direction, filled with a portion of the adjacent dielectric layers, and coupling the dielectric layers. A solid-dissolved layer, in which a second metal different from the first metal is solid-dissolved, is provided at an interface between the dielectric coupling portion and the inner electrode layer. A content of the second metal in the solid-dissolved layer is about 0.1 mol % or more and about 10 mol % or less in 100 mol of the first metal.

According to example embodiments of the present invention, a decrease in reliability of a multilayer ceramic capacitor is reliably reduced or prevented.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
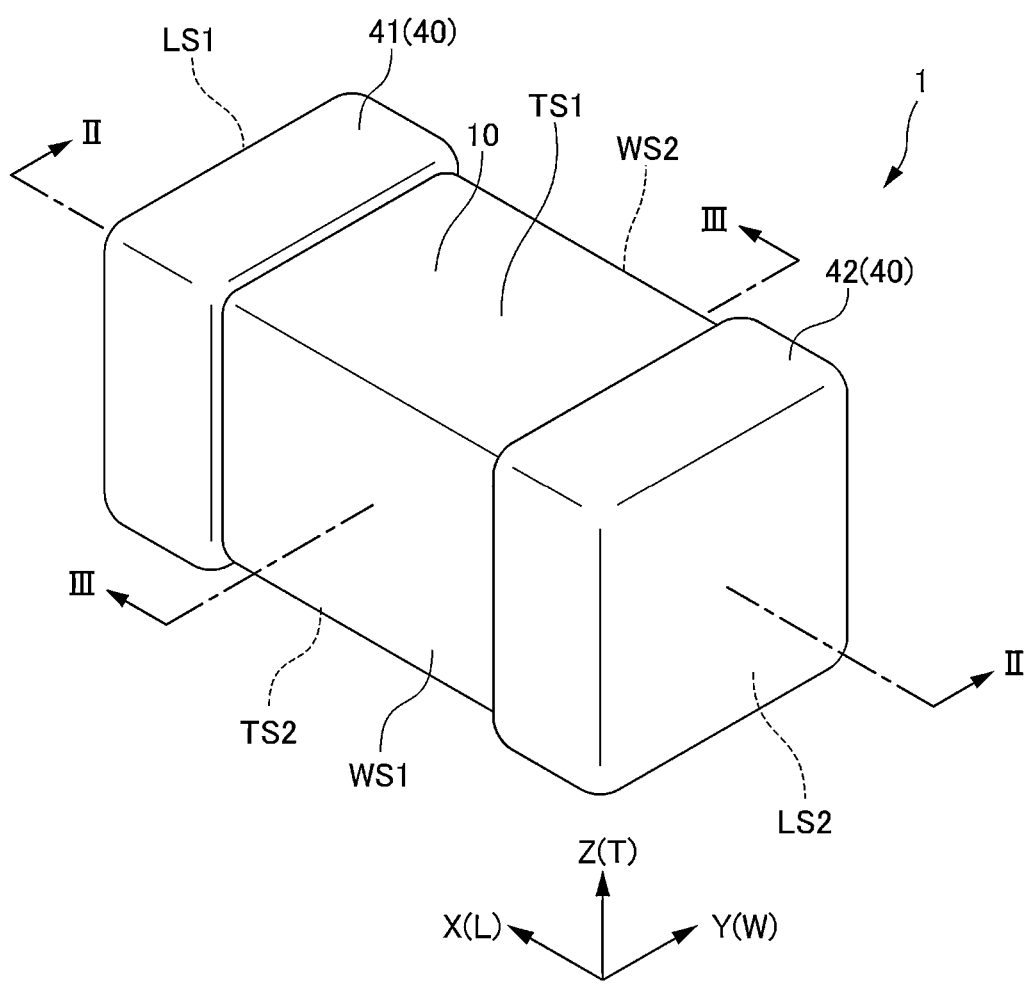
FIG. 1 is a perspective view of a multilayer ceramic capacitor according to an example embodiment of the present invention.

Hereinafter, example embodiments of the present invention will be described with reference to the accompanying drawings. In the drawings, the same or corresponding portions are denoted by the same reference signs.

Multilayer Ceramic Capacitor

Figure 2:
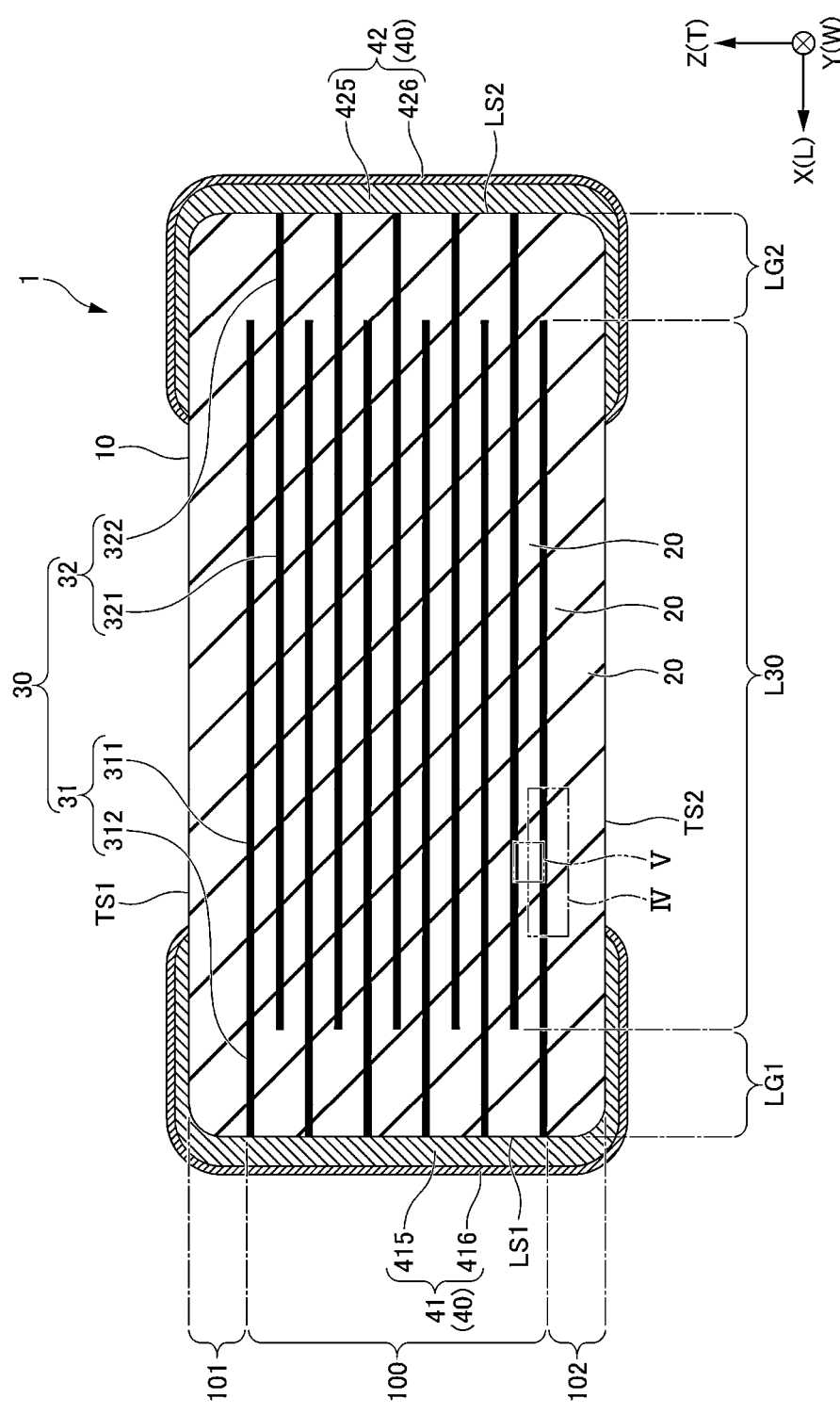
FIG. 2 is a sectional view (LT section) of the multilayer ceramic capacitor in FIG. 1 taken along a line II-II.
Figure 3:
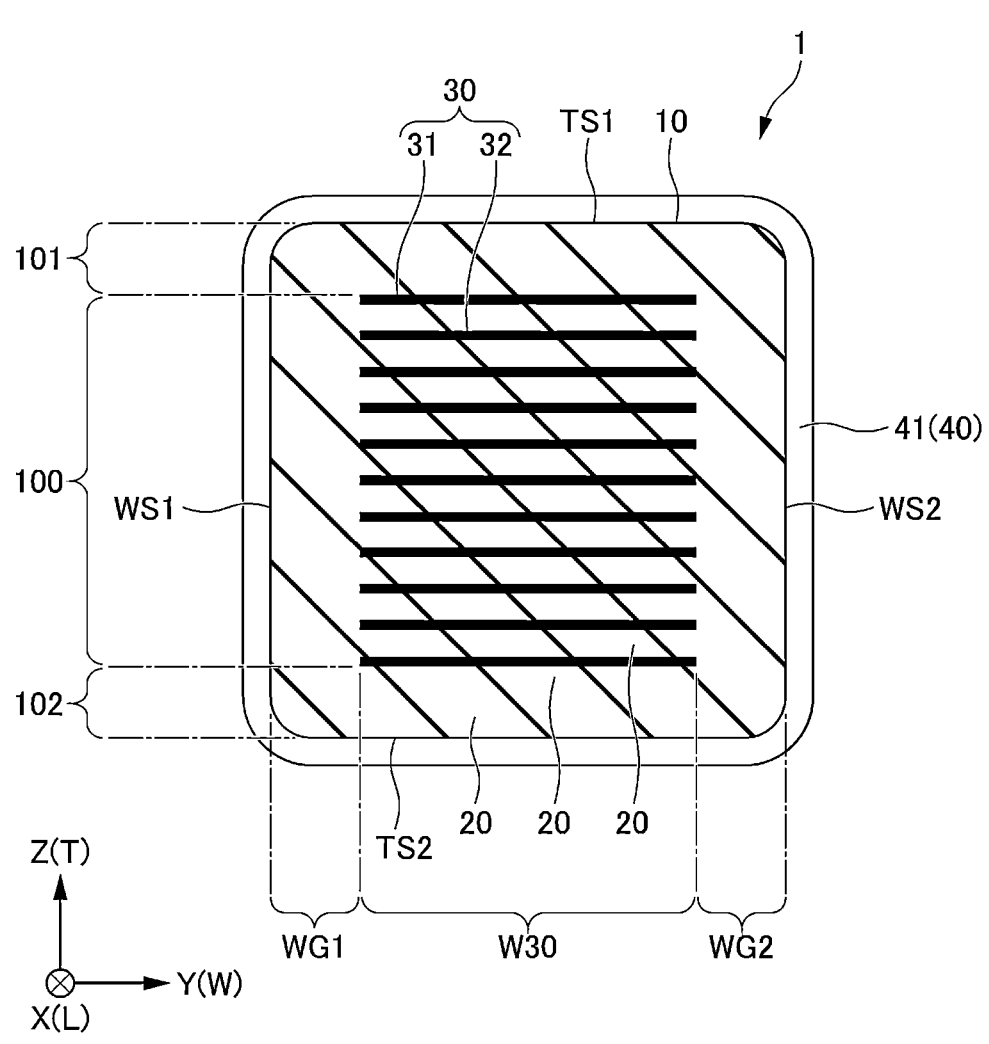
FIG. 3 is a sectional view (WT section) of the multilayer ceramic capacitor in FIG. 1 taken along a line III-III.

FIG. 1 is a perspective view of a multilayer ceramic capacitor according to an example embodiment of the present invention, FIG. 2 is a sectional view of the multilayer ceramic capacitor in FIG. 1 taken along a line II-II, and FIG. 3 is a sectional view of the multilayer ceramic capacitor in FIG. 1 taken along a line III-III. A multilayer ceramic capacitor 1 in FIG. 1 to FIG. 3 includes a multilayer body 10 and an outer electrode 40. The outer electrode 40 includes a first outer electrode 41 and a second outer electrode 42.

An XYZ-orthogonal coordinate system is described in FIG. 1 to FIG. 3. An X-direction is a length direction L of the multilayer ceramic capacitor 1 and the multilayer body 10, a Y-direction is a width direction W of the multilayer ceramic capacitor 1 and the multilayer body 10, and a Z-direction is a lamination direction T of the multilayer ceramic capacitor 1 and the multilayer body 10. Accordingly, a section illustrated in FIG. 2 is referred to as an LT section as well, and a section illustrated in FIG. 3 is referred to as a WT section.

The length direction L, the width direction W, and the lamination direction T are not necessarily in a relationship of being orthogonal or substantially orthogonal to each other, and may be in a relationship of intersecting with each other.

The multilayer body 10 has a rectangular or substantially rectangular parallelepiped shape, and includes a first main surface TS1 and a second main surface TS2 opposed to each other in the lamination direction T, a first side surface WS1 and a second side surface WS2 opposed to each other in the width direction W, and a first end surface LS1 and a second end surface LS2 opposed to each other in the length direction L.

A corner portion and a ridge portion of the multilayer body 10 each are preferably rounded. The corner portion is a portion where three surfaces of the multilayer body 10 meet, and the ridge portion is a portion where two surfaces of the multilayer body 10 meet.

As illustrated in FIG. 2 and FIG. 3, the multilayer body 10 includes a plurality of dielectric layers 20 and a plurality of inner electrode layers 30 laminated in the lamination direction T. The multilayer body 10 includes an inner layer portion 100, and a first outer layer portion 101 and a second outer layer portion 102 that sandwich the inner layer portion 100 in the lamination direction T.

The inner layer portion 100 includes a portion of the plurality of dielectric layers 20 and the plurality of inner electrode layers 30. In the inner layer portion 100, the plurality of inner electrode layers 30 are disposed so as to face each other with the dielectric layer 20 interposed therebetween. The inner layer portion 100 produces electrostatic capacitance and substantially defines and functions as a capacitor.

The first outer layer portion 101 is disposed on a side of the first main surface TS1 of the multilayer body 10, and the second outer layer portion 102 is disposed on a side of the second main surface TS2 of the multilayer body 10. More specifically, the first outer layer portion 101 is disposed between the first main surface TS1 and the inner electrode layer 30 closest to the first main surface TS1 in the plurality of inner electrode layers 30, and the second outer layer portion 102 is disposed between the second main surface TS2 and the inner electrode layer 30 closest to the second main surface TS2 in the plurality of inner electrode layers 30. The first outer layer portion 101 and the second outer layer portion 102 each include no inner electrode layer 30, but each include a portion of the plurality of dielectric layers 20 other than a portion in the inner layer portion 100. The first outer layer portion 101 and the second outer layer portion 102 each are a portion that defines and functions as a protection layer of the inner layer portion 100.

As a material of the dielectric layer 20, a dielectric ceramic may be used which contains $BaTiO_3$, $CaTiO_3$, $SrTiO_3$, $CaZrO_3$, or the like as a main component, for example. Further, as the material of the dielectric layer 20, for example, a Mn compound, an Fe compound, a Cr compound, a Co compound, a Ni compound, or the like may be added as a secondary component.

A thickness of the dielectric layer 20 is not particularly limited, but is preferably about 0.40 μm or more and about 0.50 μm or less, for example, and more preferably about 0.40 μm or more and about 0.45 μm or less, for example. The number of dielectric layers 20 is not particularly limited, but is preferably 100 or more and 2000 or less, for example. The number of dielectric layers 20 above is the total number of dielectric layers in the inner layer portion and dielectric layers in the outer layer portion.

The plurality of inner electrode layers 30 include a plurality of first inner electrode layers 31 and a plurality of second inner electrode layers 32. The plurality of first inner electrode layers 31 and the plurality of second inner electrode layers 32 are alternately disposed in the lamination direction T of the multilayer body 10.

The first inner electrode layer 31 includes a facing electrode portion 311 and an extended electrode portion 312, and the second inner electrode layer 32 includes a facing electrode portion 321 and an extended electrode portion 322.

The facing electrode portion 311 and the facing electrode portion 321 face each other with the dielectric layer 20 interposed therebetween in the lamination direction T of the multilayer body 10. The shape of each of the facing electrode portion 311 and the facing electrode portion 321 is not particularly limited, and may have a rectangular or substantially rectangular shape, for example. The facing electrode portion 311 and the facing electrode portion 321 produce electrostatic capacitance and substantially define and function as a capacitor.

The extended electrode portion 312 extends from the facing electrode portion 311 toward the first end surface LS1 of the multilayer body 10 and is exposed at the first end surface LS1. The extended electrode portion 322 extends from the facing electrode portion 321 toward the second end surface LS2 of the multilayer body 10 and is exposed at the second end surface LS2. The shape of each of the extended electrode portion 312 and the extended electrode portion 322 is not particularly limited, and may have a rectangular or substantially rectangular shape, for example.

Thus, the first inner electrode layer 31 is coupled to the first outer electrode 41, and a gap is provided between the first inner electrode layer 31 and the second end surface LS2 of the multilayer body 10, that is, the second outer electrode 42. Further, the second inner electrode layer 32 is coupled to the second outer electrode 42, and a gap is provided between the second inner electrode layer 32 and the first end surface LS1 of the multilayer body 10, that is, the first outer electrode 41.

The first inner electrode layer 31 and the second inner electrode layer 32 each contain, for example, a metal Ni as a main component. The first inner electrode layer 31 and the second inner electrode layer 32 each may contain a substance as follows as a main component, or as a component other than the main component. The substance is at least one of Cu, Ag, Pd, and Au, for example, or an alloy such as an Ag—Pd alloy containing at least one of these metals, for example. Furthermore, the first inner electrode layer 31 and the second inner electrode layer 32 may contain a dielectric particle having the same composition as the ceramic contained in the dielectric layer 20 as a component other than the main component. In the present description, the main component metal is defined as a metal component with the largest weight %.

A thickness of each of the first inner electrode layer 31 and the second inner electrode layer 32 is not particularly limited, but is preferably about 0.30 μm or more and about 0.40 μm or less, and more preferably about 0.30 μm or more and about 0.35 μm or less, for example. The number of each of the first inner electrode layers 31 and the second inner electrode layers 32 is not particularly limited, but is preferably 10 or more and 1000 or less, for example.

As illustrated in FIG. 3, in the width direction W, the multilayer body 10 includes an electrode-facing portion W30 where the inner electrode layers 30 face each other, and a first side gap portion WG1 and a second side gap portion WG2 that sandwich the electrode-facing portion W30. The first side gap portion WG1 is positioned between the electrode-facing portion W30 and the first side surface WS1, and the second side gap portion WG2 is positioned between the electrode-facing portion W30 and the second side surface WS2. More specifically, the first side gap portion WG1 is positioned between the first side surface WS1 and an end of the inner electrode layer 30 on a side of the first side surface WS1, and the second side gap portion WG2 is positioned between the second side surface WS2 and an end of the inner electrode layer 30 on a side of the second side surface WS2. The first side gap portion WG1 and the second side gap portion WG2 each include no inner electrode layer 30, and include only the dielectric layer 20. The first side gap portion WG1 and the second side gap portion WG2 each defines and functions as a protection layer for the inner electrode layer 30. The first side gap portion WG1 and the second side gap portion WG2 each are also referred to as a W gap.

As illustrated in FIG. 2, in the length direction L, the multilayer body 10 includes an electrode-facing portion L30 where the first inner electrode layer 31 and the second electrode layer 32 of the inner electrode layer 30 face each other, a first end gap portion LG1, and a second end gap portion LG2. The first end gap portion LG1 is positioned between the electrode-facing portion L30 and the first end surface LS1, and the second end gap portion LG2 is positioned between the electrode-facing portion L30 and the second end surface LS2. More specifically, the first end gap portion LG1 is positioned between the first end surface LS1 and the end of the second inner electrode layer 32 on a side of the first end surface LS1, and the second end gap portion LG2 is positioned between the second end surface LS2 and the end of the first inner electrode layer 31 on a side of the second end surface LS2. The first end gap portion LG1 includes no second inner electrode layer 32, but includes the first inner electrode layer 31 and the dielectric layer 20, and the second end gap portion LG2 includes no first inner electrode layer 31, but includes the second inner electrode layer 32 and the dielectric layer 20. The first end gap portion LG1 defines and functions as an extended electrode portion of the first inner electrode layer 31 to the first end surface LS1, and the second end gap portion LG2 defines and functions as an extended electrode portion of the second inner electrode layer 32 to the second end surface LS2. The first end gap portion LG1 and the second end gap portion LG2 are each also referred to as an L gap.

The facing electrode portion 311 of the first inner electrode layer 31 and the facing electrode portion 321 of the second inner electrode layer 32 described above are provided in the electrode-facing portion L30. Further, the extended electrode portion 312 of the first inner electrode layer 31 described above is provided in the first end gap portion LG1, and the extended electrode portion 322 of the second inner electrode layer 32 described above is present in the second end gap portion LG2.

Measurements of the multilayer body 10 described above are not particularly limited, but, for example, it is preferable that a length in the length direction L is about 0.05 mm or more and about 1.00 mm or less, a width in the width direction W is about 0.10 mm or more and about 0.50 mm or less, and a thickness in the lamination direction T is about 0.10 mm or more and about 0.50 mm or less.

Examples of methods of measuring thicknesses of the dielectric layer 20 and the inner electrode layer 30 include a method of observing the LT section, exposed by polishing, in the vicinity of a center in the width direction of the multilayer body, under a scanning electron microscope. Each value may be a mean value of measured values at a plurality of points in the length direction, or may be a mean value of measured values at a plurality of points in the lamination direction.

Similarly, examples of methods of measuring a thickness of the multilayer body 10 include a method of observing the LT section, exposed by polishing, in the vicinity of the center in the width direction of the multilayer body, or observing the WT section, exposed by polishing, in the vicinity of a center in the length direction of the multilayer body, under a scanning electron microscope. Each value may be a mean value of measured values at a plurality of points in the length direction or the width direction.

Similarly, examples of methods of measuring a length of the multilayer body 10 include a method of observing the LT section, exposed by polishing, in the vicinity of the center in the width direction of the multilayer body, under a scanning electron microscope. Each value may be a mean value of measured values at a plurality of points in the lamination direction.

Similarly, examples of methods of measuring a width of the multilayer body 10 include a method of observing the WT section, exposed by polishing, in the vicinity of the center in the length direction of the multilayer body, under a scanning electron microscope. Each value may be a mean value of measured values at a plurality of points in the lamination direction.

The outer electrode 40 includes the first outer electrode 41 and the second outer electrode 42.

The first outer electrode 41 is disposed on the first end surface LS1 of the multilayer body 10 and coupled to the first inner electrode layer 31. The first outer electrode 41 may extend from the first end surface LS1 to a portion of the first main surface TS1 and a portion of the second main surface TS2. Further, the first outer electrode 41 may extend from the first end surface LS1 to a portion of the first side surface WS1 and a portion of the second side surface WS2.

The second outer electrode 42 is disposed on the second end surface LS2 of the multilayer body 10 and coupled to the second inner electrode layer 32. The second outer electrode 42 may extend from the second end surface LS2 to a portion of the first main surface TS1 and a portion of the second main surface TS2. Further, the second outer electrode 42 may extend from the second end surface LS2 to a portion of the first side surface WS1 and a portion of the second side surface WS2.

The first outer electrode 41 includes a first underlying electrode layer 415 and a first plating layer 416, and the second outer electrode 42 includes a second underlying electrode layer 425 and a second plating layer 426. The first outer electrode 41 may include only the first plating layer 416, and the second outer electrode 42 may include only the second plating layer 426.

The first underlying electrode layer 415 and the second underlying electrode layer 425 each may be a fired layer containing a metal and glass, for example. The glass includes a glass component containing at least one selected from B, Si, Ba, Mg, Al, Li, or the like, for example. As a specific example, borosilicate glass may be used. The metal contains, for example, Cu as a main component. Further, the metal may contain at least one selected from metals such as Ni, Ag, Pd, and Au, for example, or an alloy such as Ag—Pd alloy as a main component, or as a component other than the main component.

The fired layer is obtained by applying a conductive paste containing a metal and glass to a multilayer body by, for example, a dipping method, and firing the paste. The fired layer may be fired after firing of an inner electrode layer, or may be fired simultaneously with the inner electrode layer. Further, the fired layer may include a plurality of layers.

Alternatively, the first underlying electrode layer 415 and the second underlying electrode layer 425 each may be a resin layer including a conductive particle and a thermosetting resin, for example. The resin layer may be provided on the fired layer described above, or may be directly provided on the multilayer body without forming the fired layer.

The resin layer is obtained by applying a conductive paste containing a conductive particle and a thermosetting resin to a multilayer body with a coating method and by firing the conductive paste. The resin layer may be fired after the firing of the inner electrode layer, or may be fired simultaneously with the inner electrode layer. Further, the resin layer may include a plurality of layers.

A thickness of each of the first underlying electrode layer 415 and the second underlying electrode layer 425, used as the fired layer or the resin layer, is not particularly limited, and may be, for example, about 1 µm or more and about 10 µm or less.

Alternatively, for example, the first underlying electrode layer 415 and the second underlying electrode layer 425 each may be a thin film layer of about 1 µm or less, which is formed by a thin film forming method such as, for example, a sputtering method or a vapor deposition method, and in which a metal particle is deposited.

The first plating layer 416 covers at least a portion of the first underlying electrode layer 415, and the second plating layer 426 covers at least part of the second underlying electrode layer 425. The first plating layer 416 and the second plating layer 426 each include at least one selected from metals such as Cu, Ni, Ag, Pd, or Au, or an alloy such as an Ag—Pd alloy, for example.

Each of the first plating layer 416 and the second plating layer 426 may include a plurality of layers. Preferably, each of the first plating layer 416 and the second plating layer 426 has a two layer structure including Ni plating and Sn plating, for example. The Ni plating layer may prevent the underlying electrode layer from being eroded by solder when a ceramic electronic component is mounted. The Sn plating layer may improve wettability of solder when the ceramic electronic component is mounted, whereby the ceramic electronic component may easily be mounted.

A thickness of each of the first plating layer 416 and the second plating layer 426 is not particularly limited, and may be, for example, about 1 µm or more and about 10 µm or less.

Inner Electrode Layer

Figure 4:
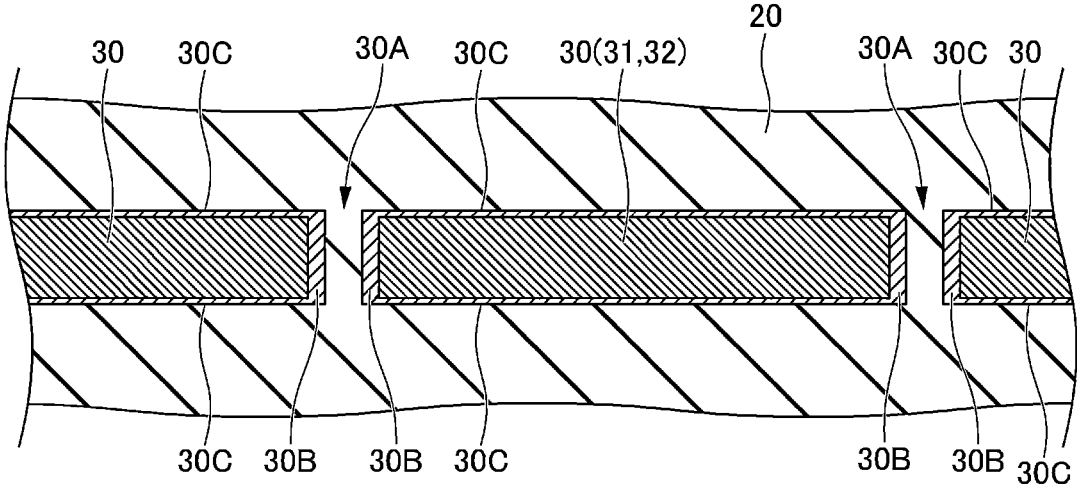
FIG. 4 is an enlarged sectional view of a portion IV of the multilayer ceramic capacitor in FIG. 2.

Next, the inner electrode layer 30, that is, the first inner electrode layer 31 and the second inner electrode layer 32 will further be described. FIG. 4 is an enlarged sectional view of a portion IV of the multilayer ceramic capacitor in FIG. 2. By reducing the thickness of the inner electrode layer 30, for example, a plurality of through holes 30A penetrating through in the lamination direction are provided in the inner electrode layer 30, that is, in each of the first inner electrode layer 31 and the second inner electrode layer 32, as illustrated in FIG. 4. The through hole 30A is filled with a portion of the adjacent dielectric layers 20 and the adjacent dielectric layers 20 appear to be coupled, and therefore, in the present description, the through hole provided in the inner electrode layer 30 is referred to as a dielectric coupling portion 30A. In other words, each of the inner electrode layers 30 is provided with the plurality of dielectric coupling portions 30A.

Here, when the dielectric coupling portion 30A is provided in the inner electrode layer 30, the concentration of electric field occurs in the dielectric coupling portion 30A, and a decrease in life expectancy, that is, a decrease in reliability of the multilayer ceramic capacitor 1 is likely to occur.

With respect to the above, a solid-dissolved layer 30B is provided at an interface between the dielectric coupling portion 30A and the inner electrode layer 30. In the solid-dissolved layer 30B, a secondary component metal of the inner electrode layer 30 such as Sn, for example, different from a main component metal of the inner electrode layer 30 such as Ni, for example, is segregated and solid-dissolved. Specifically, the solid-dissolved layer 30B is provided at the interface between the inner electrode layer 30 and the dielectric coupling portion 30A, and in the solid-dissolved layer 30B, a secondary component metal such as Sn, for example, derived from the dielectric layer 20, for example, is segregated and solid-dissolved. The metal that is solid-dissolved in the solid-dissolved layer 30B may be, for example, at least one of Sn, In, Ga, Zn, Bi, Pb, Fe, V, Y, or Cu.

When the solid-dissolved layer 30B of the secondary component metal such as, for example, Sn is provided at the interface with the dielectric coupling portion 30A, an insulation property is improved in the vicinity of an edge of the dielectric coupling portion 30A where the solid-dissolved layer 30B is provided. This may reduce or prevent the concentration of electric field in the dielectric coupling portion 30A. As a result, a decrease in life expectancy, that is, a decrease in reliability of the multilayer ceramic capacitor 1 may be reduced or prevented.

The content (molar ratio) of the secondary component metal such as Sn in the solid-dissolved layer 30B is preferably 0.1 mol % or more and 10 mol % or less, and more preferably about 0.2 mol % or more and about 2.5 mol % or less, in 100 mol of the main component metal such as Ni, for example, of the inner electrode layer 30.

When the content of the secondary component metal such as Sn in the solid-dissolved layer 30B is less than about 0.1 mol %, the above-described advantageous effect of containing the secondary component metal such as Sn is small. Meanwhile, when the content of the secondary component metal such as Sn in the solid-dissolved layer 30B exceeds about 10 mol %, a melting point of the inner electrode layer 30 lowers, and the main component metal such as Ni, for example, of the inner electrode layer 30 may become a ball. When the main component metal such as Ni, for example, becomes a ball, the inner electrode layer 30 is locally thickened, the dielectric layer 20 is locally thinned, and an electric field strength locally increases. This cancels the advantageous effect of containing the secondary component metal such as Sn described above.

The content of the secondary component metal such as Sn in the solid-dissolved layer 30B in mol % (molar ratio) in 100 mol of the main component metal such as Ni, for example, in the inner electrode layer 30 is measured as follows. Molar ratios are measured at 10 points of interfaces in a central portion in the lamination direction T, a central portion in the width direction W, and a central portion in the length direction L by TEM analysis, and are averaged to be a mean value.

The dielectric coupling portion 30A is preferably provided one or more per 100 µm in one layer of the inner electrode layer 30. The number of dielectric coupling portions 30A is measured as follows. An image is viewed under an optical microscope or a SEM with a viewing angle that includes the inner electrode of about 100 μm or more, and the images are captured in three visual fields with equal or substantially equal intervals in the lamination direction. In the captured image, the number of the dielectric coupling portions 30A is measured for each visual field, and the numbers in the three visual fields are averaged to obtain a mean number. In other words, the mean value of the numbers of the dielectric coupling portions 30A in three visual fields of the desired inner electrode layer 30 is defined as the mean number of the dielectric coupling portions 30A in the plurality of inner electrode layers 30 of the multilayer ceramic capacitor 1.

A thickness of the solid-dissolved layer 30B is, for example, preferably about 1 nm or more and about 20 nm or less. The method of measuring the thickness of the solid-dissolved layer 30B is not particularly limited, and examples thereof include the following method using wavelength dispersive X-ray spectrometry (WDX) or energy dispersive X-ray spectrometry (EDX), and scanning electron microscopy (SEM) or transmission electron microscopy (TEM).

The dielectric layer 20 is electrolytically separated from the desired inner electrode layer 30 in the vicinity of the center of the multilayer body 10 in the lamination direction T. The separation point in the lamination direction T of the multilayer body 10 is not limited to the above.

By using SEM-EDX, for example, images of about 50 μm×about 50 μm in size, for example, are captured in three visual fields in the vicinity of a center of the surface of the desired inner electrode layer 30. The capturing point and the size of the visual field in the surface of the inner electrode layer 30 are not limited to the above.

In the captured images, each of the thicknesses of the solid-dissolved layer 30B of the secondary component metal such as Sn in the vicinity of the dielectric coupling portion 30A is measured. The thicknesses of all the solid-dissolved layers 30B are averaged for each visual field, and further, the thicknesses in the three visual fields are averaged to obtain a mean thickness. In other words, the mean value of the thicknesses of the solid-dissolved layer 30B of the desired inner electrode layer 30 in the three visual fields is defined as the mean thickness of the solid-dissolved layer 30B of the plurality of inner electrode layers 30 of the multilayer ceramic capacitor 1.

The solid-dissolved layer 30B preferably covers, for example, at least about 75% or more of the periphery of the dielectric coupling portion 30A. The method of measuring the coverage rate of the solid-dissolved layer 30B is not particularly limited, and examples thereof include the following method using wavelength dispersive X-ray spectrometry (WDX) or energy dispersive X-ray spectrometry (EDX), and scanning electron microscopy (SEM) or transmission electron microscopy (TEM).

The dielectric layer 20 is electrolytically separated from the desired inner electrode layer 30 in the vicinity of the center of the multilayer body 10 in the lamination direction T. The separation point in the lamination direction T of the multilayer body 10 is not limited to the above.

By using SEM-EDX, for example, images of about 30 μm×about 30 μm in size, for example, are captured in three visual fields in the vicinity of the center of the surface of the desired inner electrode layer 30. The capturing point and the size of the visual field in the surface of the inner electrode layer 30 are not limited to the above.

In the captured images, each of coverage rates of the solid-dissolved layer 30B of the secondary component metal such as Sn in the vicinity of the dielectric coupling portion 30A is measured. The coverage rates of all of the solid-dissolved layers 30B are averaged for each visual field, and further, the coverage rates in the three visual fields are averaged to obtain a mean coverage rate. In other words, the mean value of the coverage rate of the solid-dissolved layer 30B in three visual fields of the desired inner electrode layer 30 is defined as the mean coverage rate of the solid-dissolved layer 30B in the plurality of inner electrode layers 30 of the multilayer ceramic capacitor 1.

Further, reducing the thickness of the dielectric layer 20, for example, increases the electric field strength applied to each layer, and a decrease in life expectancy, that is, a decrease in reliability of the multilayer ceramic capacitor 1 may occur.

With respect to the above, a solid-dissolved layer 30C in which a secondary component metal such as Sn is segregated and solid-dissolved may be provided at a boundary between the dielectric layer 20 and the inner electrode layer 30. Specifically, the solid-dissolved layer 30C of the secondary component metal such as Sn may also be provided at an interface between the inner electrode layer 30 and the dielectric layer 20. The content of the secondary component metal such as Sn in the solid-dissolved layer 30B is larger than the content of the secondary component metal such as Sn in the solid-dissolved layer 30C.

When the solid-dissolved layer 30C of the secondary component metal such as Sn is provided at the interface with the dielectric layer 20, the insulation property is improved at an interface with the dielectric layer 20 at which the solid-dissolved layer 30C is provided, and an increase in the electric field strength may be suppressed in the dielectric layer 20. As a result, a decrease in life expectancy, that is, a decrease in reliability of the multilayer ceramic capacitor 1 may be reduced or prevented.

Dielectric Layer

Figure 5:
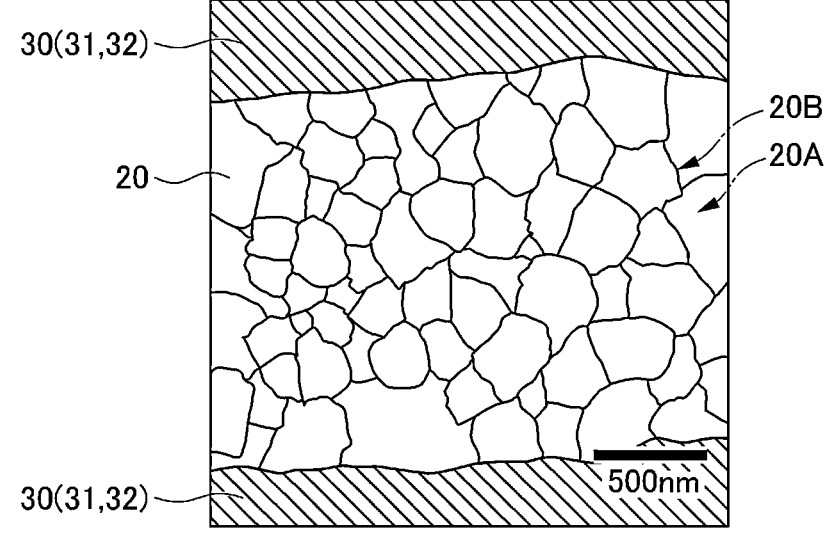
FIG. 5 is an enlarged sectional view of a portion V of the multilayer ceramic capacitor in FIG. 2.

Next, the dielectric layer 20 will be further described. FIG. 5 is an enlarged sectional view of a portion V of the multilayer ceramic capacitor in FIG. 2. As illustrated in FIG. 5, the dielectric layer 20 includes a plurality of dielectric grains 20A. The dielectric grain 20A is, as described above, made of barium titanate-based ceramic such as a perovskite compound containing Ba and Ti, for example. The dielectric grain 20A may contain, for example, at least one of La, Ce, Pr, Nd, Sm, Eu, Gd, Tb, Dy, Ho, Er, Tm, Yb, Lu, and Y as a secondary component.

The above-described secondary component metal such as Sn may be solid-dissolved in an interface 20B of the dielectric grain 20A.

Method of Manufacturing

Next, an example of a method of manufacturing the above-described multilayer ceramic capacitor 1 will be described. First, a dielectric sheet for the dielectric layer 20 and a conductive paste for the inner electrode layer 30 are prepared. The dielectric sheet contains Sn. For example, there is used an insulation sheet containing a dielectric grain particle having a core-shell structure in which a surface is coated with Sn. The dielectric sheet and the conductive paste each contain a binder and a solvent. For each of the binder and the solvent, a known material may be used.

Next, the conductive paste is printed on the dielectric sheet in a predetermined pattern, for example, to form an inner electrode pattern on the dielectric sheet. Methods of forming the inner electrode pattern include screen printing, gravure printing, or the like.

Next, dielectric sheets for the second outer layer portion 102, on which no inner electrode pattern is printed, are laminated in a predetermined number. Dielectric sheets for the inner layer portion 100, on which the inner electrode pattern is printed, are sequentially laminated thereon. Dielectric sheets for the first outer layer portion 101, on which no inner electrode pattern is printed, are laminated thereon in a predetermined number. Thus, a multilayer sheet is produced.

Next, the multilayer sheet is pressed in the lamination direction by, for example, isostatic press or the like to produce a multilayer block. Subsequently, the multilayer block is cut into a predetermined size to cut out a multilayer chip. At this time, corner portions and ridge portions of the multilayer chip are rounded by barrel polishing or the like.

Next, the multilayer chip is fired to produce the multilayer body 10. The firing temperature is, for example, preferably about 900° C. or more and about 1400° C. or less, depending on the materials of the dielectric and the inner electrode.

At this time, the plurality of dielectric coupling portions 30A are formed in the inner electrode layer 30, and the solid-dissolved layer 30B, in which Sn derived from the dielectric layer 20 is segregated and solid-dissolved, is formed at the interface between the dielectric coupling portion 30A and the inner electrode layer 30. Further, the solid-dissolved layer 30C, in which Sn derived from the dielectric layer 20 is segregated and solid-dissolved, may be formed between the dielectric layer 20 and the inner electrode layer 30. Furthermore, Sn may remain in the interface 20B of the dielectric grain 20A of the dielectric layer 20, that is, Sn may be segregated and solid-solved.

Next, for example, using a dipping method, the first end surface LS1 of the multilayer body 10 is immersed in a conductive paste, which is an electrode material for an underlying electrode, to apply the conductive paste for the first underlying electrode layer 415 to the first end surface LS1. Similarly, using a dipping method, the second end surface LS2 of the multilayer body 10 is immersed in a conductive paste, which is an electrode material for an underlying electrode, to apply the conductive paste for the second underlying electrode layer 425 to the second end surface LS2. Thereafter, by firing the conductive paste, the first underlying electrode layer 415 and the second underlying electrode layer 425, which are fired layers, are formed. The firing temperature is, for example, preferably about 600° C. or more and about 900° C. or less.

As described above, for example, the first underlying electrode layer 415 and the second underlying electrode layer 425, which are resin layers, may be formed by applying a conductive paste containing a conductive particle and a thermosetting resin with a coating method and by firing the conductive paste, or the first underlying electrode layer 415 and the second underlying electrode layer 425, which are thin films, may be formed with a thin film forming method such as a sputtering method or a vapor deposition method.

Thereafter, the first plating layer 416 is formed on the surface of the first underlying electrode layer 415 to form the first outer electrode 41, and the second plating layer 426 is formed on the surface of the second underlying electrode layer 425 to form the second outer electrode 42. The above-described multilayer ceramic capacitor 1 is obtained with processes above.

As described above, in the multilayer ceramic capacitor 1 of the present example embodiment, the plurality of dielectric coupling portions 30A are formed in the inner electrode layer 30 by reducing the thickness of the inner electrode layer 30, for example, and the solid-dissolved layer 30B is formed at the interface between the dielectric coupling portion 30A and the inner electrode layer 30. In the solid-dissolved layer 30B, the secondary component metal such as Sn, for example, different from the main component metal such as Ni, for example, of the inner electrode layer 30 is solid-dissolved. This may improve the insulation property in the vicinity of the edge of the dielectric coupling portion 30A where the solid-dissolved layer 30B is formed, and may reduce or prevent the concentration of electric field in the dielectric coupling portion 30A. As a result, a decrease in life expectancy, that is, a decrease in reliability of the multilayer ceramic capacitor 1 may be reduced or prevented.

In the multilayer ceramic capacitor 1 according to the present example embodiment, a solid-dissolved layer 30C, in which the secondary component metal such as Sn, for example, is solid-dissolved, may be formed at the interface between the inner electrode layer 30 and the dielectric layer 20. The content of the secondary component metal such as Sn in the solid-dissolved layer 30B is larger than the content of the secondary component metal such as Sn in the solid-dissolved layer 30C. This may improve the insulation property at the interface with the dielectric layer 20 at which the solid-dissolved layer 30C is formed, and may reduce or prevent an increase of the electric field strength because of reducing the thickness of the dielectric layer 20, for example. As a result, a decrease in life expectancy, that is, a decrease in reliability of the multilayer ceramic capacitor 1 may be reduced or prevented.

Although the example embodiments of the present invention have been described above, the present invention is not limited to the above-described example embodiments, and various modifications and variations can be made. For example, as an example of a method of manufacturing a multilayer ceramic capacitor, a method may be applied in which side gap dielectric for the side surfaces WS1 and WS2 of the multilayer body 10 in the width direction W may be attached later. In the case above, end portions of the inner electrode layer on both sides in the width direction W are aligned (aligned with an error of about μm, for example).

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   dielectric layers made of a ceramic material; and
   inner electrode layers; wherein
   the dielectric layers and the inner electrode layers are laminated;
   the inner electrode layers include a first metal as a main component;
   the inner electrode layers include dielectric coupling portions penetrating through in a lamination direction, filled with a portion of adjacent dielectric layers of the dielectric layers, and coupling the adjacent dielectric layers;
   a dielectric coupling interface solid-dissolved layer, in which a second metal different from the first metal is solid-dissolved, is provided at an interface between the dielectric coupling portions and the inner electrode layers;
   a dielectric layer interface solid-dissolved layer, in which a second metal different from the first metal is solid-dissolved, is provided at an interface between the dielectric layer and the inner electrode layer; and
   a highest content of the second metal in the dielectric coupling interface solid-dissolved layer is larger than a highest content of the second metal in the dielectric layer interface solid-dissolved layer.

2. The multilayer ceramic capacitor according to claim 1, wherein a content of the second metal in the dielectric layer interface solid-dissolved layer is about 0.1 mol or more and about 10 mol or less in 100 mol of the first metal.

3. The multilayer ceramic capacitor according to claim 1, wherein one or more of the dielectric coupling portions is provided per about 100 μm in each of the inner electrode layers.

4. The multilayer ceramic capacitor according to claim 1, wherein the dielectric coupling interface solid-dissolved layer covers at least about 75% or more of a periphery of the dielectric coupling portion.

5. The multilayer ceramic capacitor according to a claim 1, wherein each of the inner electrode layers has a thickness of about 0.30 μm or more and about 0.40 μm or less; and
    each of the dielectric layers has a thickness of about 0.40 μm or more and about 0.50 μm or less.

6. The multilayer ceramic capacitor according to claim 1, wherein
    the dielectric layers include a dielectric grain; and
    the second metal is solid-dissolved in an interface of the dielectric grain.

7. The multilayer ceramic capacitor according to claim 1, wherein the first metal is Ni.

8. The multilayer ceramic capacitor according to claim 1, wherein the second metal is at least one of Sn, In, Ga, Zn, Bi, Pb, Fe, V, Y, or Cu.

9. The multilayer ceramic capacitor according to claim 1, wherein the solid-dissolved layer has a thickness of about 1 nm or more and about 20 nm or less.

10. The multilayer ceramic capacitor according to claim 1, wherein each of the dielectric layers includes $BaTiO_3$, $CaTiO_3$, $SrTiO_3$, or $CaZrO_3$ as a main component.

11. The multilayer ceramic capacitor according to claim 10, wherein each of the dielectric layers includes a Mn compound, an Fe compound, a Cr compound, a Co compound, or a Ni compound as a secondary component.

12. The multilayer ceramic capacitor according to claim 1, wherein each of the dielectric layers has a thickness of about 0.40 μm or more and about 0.45 μm or less.

13. The multilayer ceramic capacitor according to claim 1, wherein a number of the dielectric layers is 100 or more and 2000 or less.

14. The multilayer ceramic capacitor according to claim 1, wherein a thickness of each of the inner electrode layers is about 0.30 μm or more and about 0.40 μm or less.

15. The multilayer ceramic capacitor according to claim 1, wherein a thickness of each of the inner electrode layers is about 0.30 μm or more and about 0.35 μm or less.

16. The multilayer ceramic capacitor according to claim 1, wherein a number of the inner electrode layers is 10 or more and 1000 or less.

17. The multilayer ceramic capacitor according to claim 1, wherein
    the dielectric layers and the inner electrode layers define a multilayer body; and
    the multilayer body has a dimension in a length direction of about 0.05 mm or more and about 1.00 mm or less, a dimension in a width direction of about 0.10 mm or more and about 0.50 mm or less, and a dimension in a lamination direction of about 0.10 mm or more and about 0.50 mm or less.

18. The multilayer ceramic capacitor according to claim 1, wherein the dielectric layers and the inner electrode layers define a multilayer body; and
    outer electrodes are provided on end surfaces of the multilayer body and coupled to the inner electrode layers.

19. The multilayer ceramic capacitor according to claim 18, wherein each of the outer electrodes includes an underlying electrode layer and a plating layer.

20. The multilayer ceramic capacitor according to claim 19, wherein the underlying electrode layer includes metal and glass.

* * * * *